H. MORE.
Potato-Diggers.

No. 196,760. Patented Nov. 6, 1877.

WITNESSES
G. R. Hoffman
D. Harry Hammer

INVENTOR
Hiram Moore

N. PETERS, PHOTO-LITHOGRAPHER, WASHINGTON, D. C.

UNITED STATES PATENT OFFICE.

HIRAM MORE, OF CHICAGO, ILLINOIS.

IMPROVEMENT IN POTATO-DIGGERS.

Specification forming part of Letters Patent No. 196,760, dated November 6, 1877; application filed July 17, 1877.

*To all whom it may concern:*

Be it known that I, HIRAM MORE, of the city of Chicago, county of Cook, and State of Illinois, have invented a certain new and useful Improvement in Potato-Diggers; and I do hereby declare that the following is a full, clear, and exact description of said invention, reference being had to the accompanying drawings, making a part of this specification.

Figure 1:
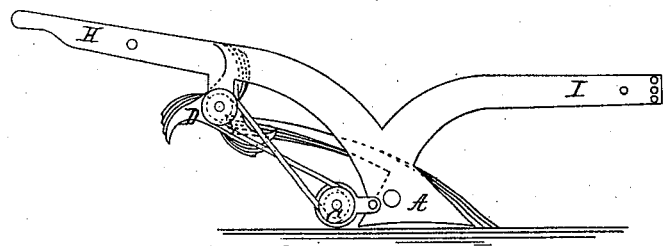
Figure 2:
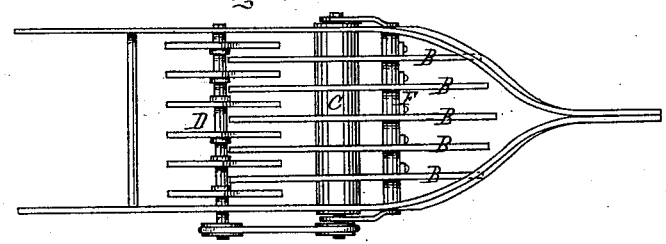
Figure 3:
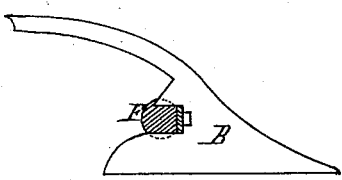
Figure 4:
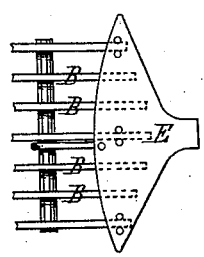

Figure 1 represents a side view of my invention. Fig. 2 is a top view. Fig. 3 is a view of one of the inner tines. Fig. 4 represents an adjustable point.

Similar letters of reference indicate corresponding parts in all of the figures.

To enable others skilled in the art to make and use my invention, I will proceed to describe the same.

A represents one of the principal tines, in connection with the handle H and beam I. The inner tines are represented by B B.

C represents a roller-iron, with a pulley on the end, over which an endless chain or band turns separator D.

E represents a point, attached by means of eyes riveted to point E, and fastened by a connecting-rod to the shaft F. This point E is intended for stony or stumpy ground, as a protection to the tines.

The object of the roller C is to free the tines B of weeds, and to drive the separator D, and to level the ground, that the potatoes may have a smooth surface to fall upon.

The outer tines B are higher at their terminus than those tines nearer the center, the object being to force the potatoes toward the center, that they may fall in a narrow compass.

The tines are fastened to the shaft F, the shaft being grooved and the tines notched. A projection from the tine is bolted to the shaft.

The points of outer tines of separator D, like those of the principal tines B, are higher than those of the center, for the purpose of rolling the potatoes to the middle.

The upper edge of the tines B should be thicker than the lower edge, in order that anything entering between the tines may pass freely through.

What I claim as new, and desire to secure by Letters Patent of the United States, is as follows:

1. The separate parallel and stationary tines B and side pieces A, adjusted to pass below the potatoes and bring them to the surface, combined with a roller, C, mounted in bearings attached to said side pieces A A, to smooth the ground for the reception of the potatoes when discharged.

2. The separate tines B, arranged as described, combined with the removable share or point E, which covers the points of all said tines, and is attached thereto by means of loops and a rod hooking over the shaft F, for the purpose set forth.

3. The tines B and side pieces A, as described, and the revolving clearer, having a pulley at its end, combined with a leveling-roller, C, mounted in bearings attached to the side pieces A, and provided with a pulley, for the purpose of communicating motion from said roller to said clearer.

HIRAM MORE.

Witnesses:
D. HARRY HAMMER,
FRANCIS T. COLBY.